United States Patent
Liu et al.

(10) Patent No.: US 7,840,231 B2
(45) Date of Patent: Nov. 23, 2010

(54) METHOD TO ADJUST FORWARD TRANSMISSION POWER CONTROL THRESHOLD IN MOBILE COMMUNICATION SYSTEM

(75) Inventors: Xuemin Liu, Shenzhen (CN); Xin Li, Shenzhen (CN); Xiaohan Liu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 661 days.

(21) Appl. No.: 11/720,821

(22) PCT Filed: Dec. 2, 2004

(86) PCT No.: PCT/CN2004/001401
§ 371 (c)(1),
(2), (4) Date: Jun. 21, 2007

(87) PCT Pub. No.: WO2006/058461
PCT Pub. Date: Jun. 8, 2006

(65) Prior Publication Data
US 2008/0139234 A1    Jun. 12, 2008

(51) Int. Cl.
*H04B 7/00* (2006.01)
(52) U.S. Cl. .................................. 455/522; 455/561
(58) Field of Classification Search ................ 455/522, 455/69, 67.11, 517, 88, 13.4, 115.1, 115.3, 455/561; 370/525, 311, 335, 318, 332
See application file for complete search history.

(56) References Cited

U.S. PATENT DOCUMENTS

| | | | | |
|---|---|---|---|---|
| 6,151,508 | A * | 11/2000 | Kim et al. | 455/522 |
| 6,405,052 | B1 * | 6/2002 | Faber | 455/522 |
| 7,515,923 | B2 * | 4/2009 | Lee et al. | 455/522 |
| 7,603,134 | B2 * | 10/2009 | Cho | 455/522 |
| 2004/0218520 | A1 * | 11/2004 | Aizawa | 370/203 |

FOREIGN PATENT DOCUMENTS

| | | |
|---|---|---|
| CN | 1394020 | 1/2003 |
| WO | 9734372 | 9/1997 |
| WO | 0048336 | 8/2000 |
| WO | 0207340 | 1/2002 |
| WO | 0249237 | 6/2002 |

* cited by examiner

*Primary Examiner*—Yuwen Pan
*Assistant Examiner*—Ankur Jain
(74) *Attorney, Agent, or Firm*—Brooks Kushman PC

(57) ABSTRACT

The present invention relates to a method for adjusting forward transmission power control threshold in a mobile communication system, comprising the following steps of: setting in advance at the base station side an overload control threshold and an adjustment range of the power control threshold of sector forward transmission power; obtaining current total values of the forward transmission power of the sector; judging whether the sector forward transmission power exceeds said overload control threshold; judging whether the sector forward transmission power exceeds said adjustment range of the control threshold; dynamically adjusting the forward transmission power threshold, and so on. By the steps of pre-setting the overload control threshold and power control threshold adjustment range of the sector forward transmission power, obtaining the current total values of the forward transmission power of the whole sector and judging whether the sector forward transmission power exceeds the overload threshold and so on, the present invention realizes real-time regulation of the sector forward transmission power, thereby can track the variance of the actual forward transmission power, and ensure CDMA mobile communication system having a good communication service quality.

9 Claims, 2 Drawing Sheets

METHOD TO ADJUST FORWARD TRANSMISSION POWER CONTROL THRESHOLD IN MOBILE COMMUNICATION SYSTEM

CROSS REFERENCE TO PRIOR APPLICATION

This application is a U.S. national phase of International Patent Application Serial No. PCT/CN2004/001401, filed Dec. 2, 2004, the disclosure of which is incorporated herein by reference in its entirety.

TECHNICAL FIELD

The present invention relates to a method for adjusting forward transmission power control threshold in a mobile communication system, especially to a method for adjusting the forward transmission power control threshold in a CDMA mobile communication system according to the actual sector transmission power overload condition. The invention belongs to the field of communication techniques.

BACKGROUND ART

In a CDMA mobile communication system, the power control will directly affect the system communication performance, which mainly refers to communication capacity and call drop rate.

The method of controlling the forward power in a CDMA mobile communication system usually includes open loop, closed loop, and outer loop control, which are used to control the power of transmitting signals form a base station to a terminal, wherein in the closed loop control, a control range of the forward transmission power, i.e. the control threshold Ptx_lower and Ptx_upper, needs to be set, and the actual forward transmission power is constrained within the range of these two power thresholds. Ptx_lower is the lower bound of the forward transmission power, if it is set too low, call drop will easily happen, especially in fast fading areas; and if it is set too high, the system capacity will be affected. Ptx_upper is the upper bound of the forward transmission power; if it is set too low, voice quality can not be assured in places of bad signal quality, and call drop happens easily at the same time; and if it is set too high, the system capacity will also be affected, resulting in the overload of the forward transmission power easily. Therefore, determining suitable upper bound and lower bound of the forward transmission power is important for promoting the performance of CDMA mobile communication system. Usually, in a system (or in a sector), Ptx_lower and Ptx_upper are fixed, which are experience values under theoretical instructions. Due to the particular complexity of the mobile communication, such as the greatly variant traffics in different time periods and the different transmission modes, the forward transmission power is actually fluctuant. The fixed Ptx_lower and Ptx_upper can not trace such variations in real-time, and can not adapt to the changes of the dynamically varying communication environment and the fluctuation of the call capacity. Generally, in different time periods, due to an increase of the traffic, signal distortion will occur if the sector forward transmission power is overloaded, which will greatly affect the performance of the communication system. In the case of the overloaded sector power, how to ensure the whole system can quit the overload state as soon as possible and ensure the bad effects to the system can be reduced to the minimum during the course of quitting the overload state is essential to the power control.

Currently, there are some methods for dynamically regulating the forward power in a CDMA mobile communication system, such as the method of channel adaptive power control. In this method, by using a group of different TPC algorithms (TPCAs) of random size, the transmission power can be controlled in a channel adaptive mode. Each TPCA should adapt well to a particular type of channel. In the method, different algorithms and rules for determining whether an algorithm is good should be set. However, using different algorithms to track the channel can not ensure the feature of real-time.

Furthermore, overload control usually adopts a method of multi-level control. During the implementation, many levels, such as forbidding a new call, forbidding additional channel assignment, forbidding soft handover and forbidding terminal power increase, etc. are to be defined. Under such overload control, transmission power of all terminals are finally controlled, i.e. during the course of overload, the forward transmission power of the terminal should not exceed the transmission power at the moment of entering the overload state (which is analogous to reduce the upper threshold of the forward transmission power). In such way, since the forward transmission power of a good link is originally low, if its transmission power increase is restrained, it may result in a call drop, and also because the transmission power is very small, its contribution to the reduction of overload after the call drop is not significant.

Based on the discussion above, how to optimize the forward power control effect in a CDMA mobile communication system and better control the sector forward transmission power overload of the system is an important technical problem needing to be solved by the skilled in the art.

SUMMARY OF THE INVENTION

The purpose of the invention is to provide a method for adjusting forward transmission power control threshold in a mobile communication system in regard to the problem that the variation of the actual forward transmission power can not be tracked well due to a fixed forward transmission power control threshold in a CDMA mobile communication system. In the method, good communication service quality is ensured in the sector by controlling the transmission power of the whole sector through dynamically adjusting the forward transmission power control threshold.

In order to achieve the purpose above, the technical scheme used in the invention is a method for adjusting the forward transmission power control threshold in a mobile communication system, comprising the following steps of:

a. setting in advance at the base station side an entering overload control threshold of sector forward transmission power, a lower bound (Ptx_lower) and an upper bound (Ptx_upper) of the forward transmission power control threshold, and the adjustment ranges of said lower bound and upper bound, in which, the adjustment ranges of said lower bound and upper bound are the width within which said lower bound and upper bound of the forward transmission power control threshold are permitted to fluctuate;

b. obtaining the current total values of the forward transmission power of the sector;

c. judging whether the sector forward transmission power exceeds said entering overload control threshold, if yes, turning to step d; otherwise, turning to step f with no adjustment;

d. judging whether the sector forward transmission power exceeds the adjustment ranges of said lower bound and upper bound, if not, decreasing the forward transmission power control threshold in the sector to which all terminals correspond; if yes, turning to step f directly; and f. completing one dynamical adjustment of the forward transmission power control threshold.

The process of presetting the adjustment ranges of the lower bound and upper bound of the forward transmission power control threshold above includes: a step of pre-setting an adjustment step length parameter Δ and a step of presetting a permitted adjustment times m.

When using the adjustment step length parameter Δ and the permitted adjustment times m, the adjustment range of the lower bound is (Ptx_lower−mΔ, Ptx_lower), and the adjustment range of the upper bound is (Ptx_upper−mΔ, Ptx_upper).

During the specific adjustment of the forward transmission power control threshold, when reducing the forward transmission power control threshold in the sector to which all terminals correspond, it is first to judge whether the forward transmission power control threshold after the adjustment will exceed the adjustment ranges of the lower bound and the upper bound, if exceed, it means that the adjustment has reached to the maximum and no further adjustment can be done, thus, the process ends directly and one adjustment completes; if not exceed, the forward transmission power control threshold can be reduced by the value corresponding to one adjustment step length parameter Δ.

Additionally, when presetting the entering overload control threshold of the sector forward transmission power at the base station side, a departing overload control threshold can also be pre-set at the same time. The reason is that, when the forward transmission power is too low, if the control threshold of the sector forward transmission power can not be increased in time, a call drop may happen for some terminals because the relative high forward transmission power can not be obtained when the signal quality of the forward link worsens suddenly. Therefore, adding a step of judging whether the forward transmission power of this sector is lower than the departing overload control threshold is helpful to provide a better communication service for all terminals in the sector. The detailed process is as follows: if the forward transmission power is not lower than the departing overload control threshold, it means that the forward transmission power of this sector is normal and the forward transmission power control threshold to which all terminals in the sector correspond does not need to be adjusted; if the forward transmission power is lower than the departing overload control threshold, it is first to judge whether the forward transmission power control threshold after this adjustment will exceed the pre-set adjustment ranges of the lower bound or the upper bound, if exceed, it means that the adjustment has reached to the maximum and no further adjustment can be done, thus the process ends directly and one adjustment completes; if not exceed, the forward transmission power control threshold of all terminals in this sector will be increased by the value corresponding to one adjustment step length parameter Δ.

Following step b above, another step can be added to judge whether there is a forward transmission power control threshold to which some terminals in the sector correspond that is greater than the lower bound (Ptx_lower) or the upper bound (Ptx_upper) of said entering overload control threshold respectively, if the judging result is "yes", the forward transmission power control threshold corresponding to these terminals is forcibly set as the lower bound (Ptx_lower) or the upper bound (Ptx_upper) of the entering overload threshold.

From the technical scheme above, by presetting the overload control threshold and the power control threshold adjustment range of the sector forward transmission power, obtaining the current total values of the forward transmission power of the whole sector and judging whether said sector forward transmission power exceeds the overload threshold and so on, the invention realizes the real-time regulation of the sector forward transmission power control threshold, thereby can track the variance of the actual forward transmission power, and ensure CDMA mobile communication system having a good communication service quality.

In the following, the invention will be described in detail by way of specific embodiments with reference to accompanied drawings.

PREFERRED EMBODIMENTS OF THE INVENTION

Figure 1:
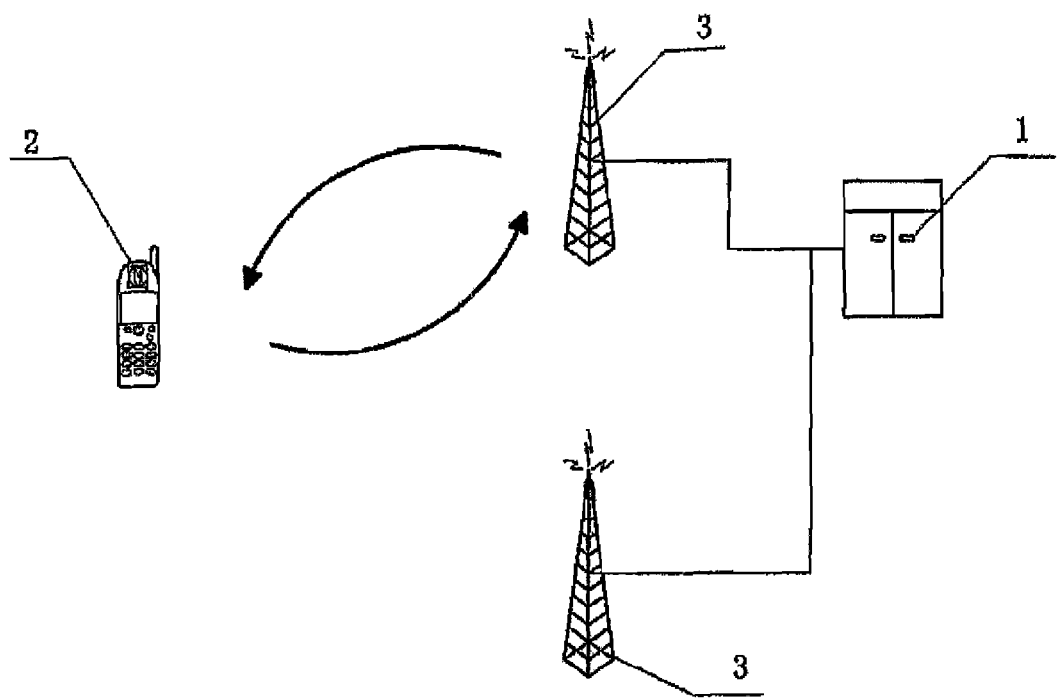
FIG. 1 is a schematic view of structure of a specific communication system according to this invention.

FIG. 1 shows the basic mode of forward power control in a CDMA mobile communication system, including forward open-loop power control, forward closed-loop power control, and forward outer-loop power control, wherein, when initially establishing a forward link, the initial transmission power of the forward link is determined by the forward open-loop power control, and is usually set by the resource library of base station controller 1.

The forward closed-loop power control involves terminal 2 and base station 3. The terminal 2 decides whether to transmit an increasing-power command or a decreasing-power command (called as forward power control bits) on the backward link by measuring the signal quality of the forward link, such as SNR, and comparing the practically measured value with the objective value. After receiving the forward power control bits, the base station 3 increases or decreases the transmission power of the forward link according to the value of the bits. The period of the forward closed-loop power control is usually much less than the frame period. Generally, if the measured value is less than the objective value, an increasing command is sent; if the measured value is greater than the objective value, a decreasing command is sent.

Figure 2:
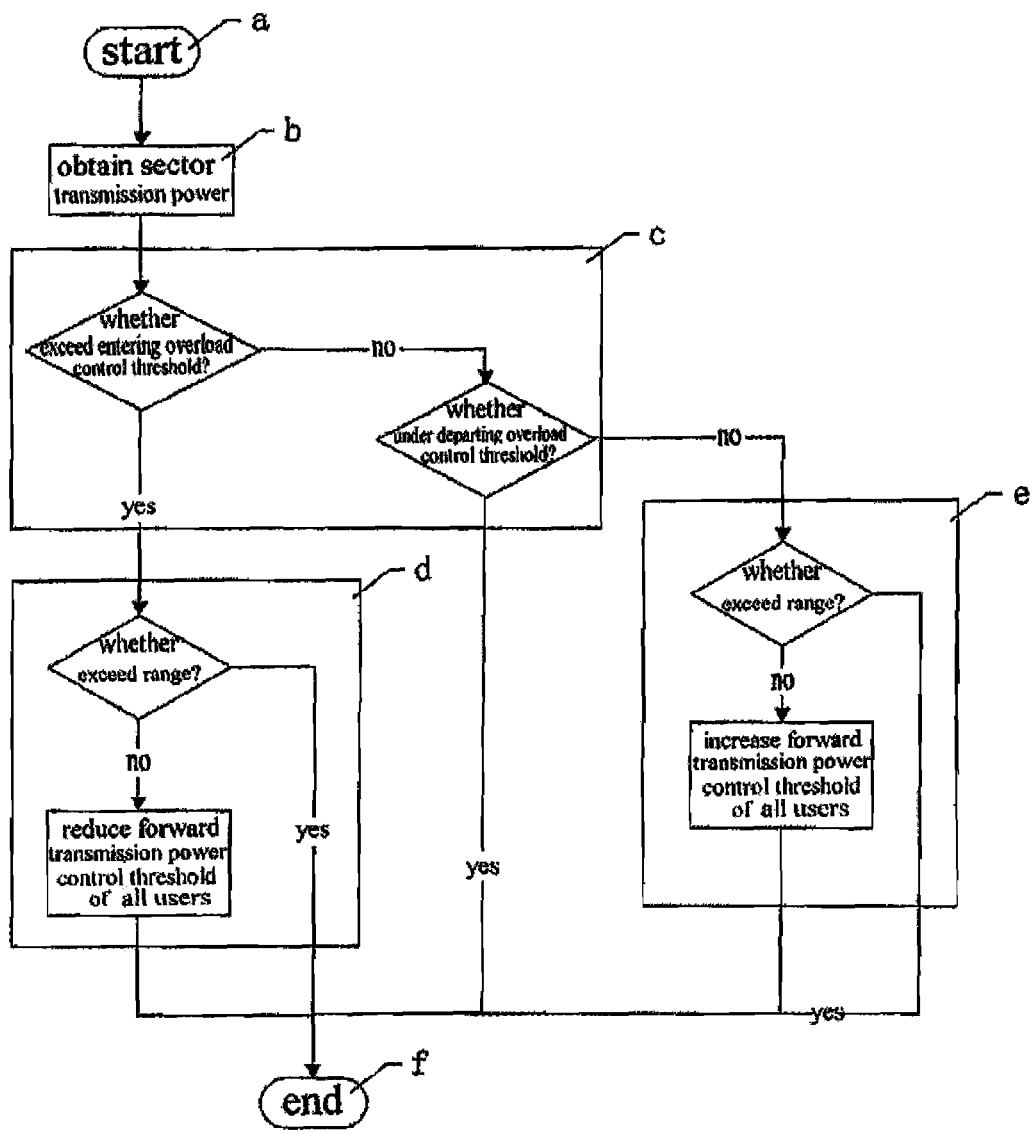
FIG. 2 is a flow chart of adjustment of a specific embodiment according to this invention.

In the CDMA mobile communication system, the specific implementation of the method for adjusting the forward transmission power control threshold of a sector is shown as FIG. 2, with the following steps of:

a. pre-setting at the base station side (the resource library of the base station controller) an entering overload control threshold and a departing overload control threshold of the sector forward transmission power, a lower bound (Ptx_lower) and an upper bound (Ptx_upper) of the forward transmission power control threshold and the adjustment ranges of the lower bound and the upper bound before adjusting the sector forward transmission power control threshold, in which, the departing overload threshold is not greater than the entering overload threshold.

Specifically, if the sector forward transmission power is 95% of the sector rated transmission power, it can be set as the entering overload control threshold; if the sector forward transmission power is 85% of the sector rated transmission power, it can be set as the departing overload control threshold. The sector forward transmission power overload control threshold should be determined according to the communication environment of the base station and the statistical result of the system performance.

The adjustment range of the sector forward transmission power control threshold comprises the adjustment ranges of the lower bound (Ptx_lower) and the upper bound (Ptx_upper) of the power control threshold, the adjustment ranges are the width parameter values within which the power control threshold is permitted to fluctuate.

The actual transmission power is within the range of [Ptx_lower, Ptx_upper]. The adjustment range of the control threshold, i.e. Ptx_lower and Ptx_upper, is not fixed. In order to ensure that the upper and lower bounds after the adjustment are meaningful (if the upper bound reduces to zero, it is meaningless) and valid (if the power threshold is too low or too high, the stability of the system will be affected), in specific implementation, multi-level control may be used, and the permitted adjustment times m can be defined as 3, the adjustment step length parameter as $\Delta$, thus, the adjustment range of the sector forward transmission power overload control threshold can be:

adjustment range of the lower bound: [Ptx_lower−3$\Delta$, Ptx_lower];

adjustment range of the upper bound: [Ptx_upper−3$\Delta$, Ptx_upper].

In the case of overload, adjustment can be conducted continuously for 3 times, and the final power control threshold is decreased by 3$\Delta$. The adjustment range may also determine the optimal adjustment step length $\Delta$ and the levels of the permitted adjustment times m according to the practical conditions of a commercial environment.

After the entering overload control threshold, the departing overload control threshold of the sector forward transmission power and the adjustment range of the forward transmission power control threshold are set, the forward transmission power control threshold can be adjusted dynamically through the following steps when the sector forward transmission power is overloaded.

b. obtaining the current total forward transmission power of the sector, wherein, the base station obtains the forward transmission powers of all terminals in the sector respectively, which are added together to form the current total forward transmission power.

c. judging whether the sector forward transmission power exceeds the overload threshold.

Specifically, first judging whether the sector forward transmission power exceeds the entering overload control threshold, if yes, turning to step d; if not, turning to judge whether the sector forward transmission power is lower than the departing overload control threshold, if yes, turning to step f, if not, turning to step e.

Said step e is: judging whether the sector forward transmission power control threshold exceeds the adjustment range, if not, increasing the forward transmission power control threshold to which all terminals in this sector correspond; if yes, turning to step f.

d. judging whether the sector forward transmission power exceeds the adjustment range of the forward transmission power control threshold, if not, reducing the forward transmission power control threshold to which all terminals in the sector correspond and then turning to step f; if yes, no adjustment can be performed, and turning to step f directly.

f. completing one dynamical adjustment of the forward transmission power control threshold.

In step d above for adjusting the control threshold, before reducing the forward transmission power control threshold to which all terminals in the sector correspond, the following more specific step can be added: judging whether the established adjustment range will be exceeded after the adjustment, if not, it indicating that there are still spare amount for adjusting, then reducing the forward transmission power control threshold to which all terminals in the sector correspond by a value corresponding to one adjustment step length parameter $\Delta$; if yes, it indicating that the adjustment can not be further performed and turning to step f directly.

Similarly, in step e above for adjusting the control threshold, before increasing the forward transmission power control threshold to which all terminals in the sector correspond, the following specific step can be added: judging whether the established adjustment range will be exceeded after the adjustment; if not it indicating that there is still spare amount for adjusting, then increasing the forward transmission power control threshold to which all terminals in the sector correspond by a value corresponding to one adjustment step length parameter $\Delta$; if yes, it indicating that the adjustment can not be further performed and turning to step f directly.

During the above process of adjusting the sector forward transmission power control threshold, a step can be added after step b for judging whether there is a forward transmission power control threshold in the sector to which some terminals correspond that is greater than the lower bound (Ptx_lower) and upper bound (Ptx_upper) of the entering overload threshold respectively, if the judging result is "yes", forcibly setting the forward transmission power control threshold to which some terminals correspond as the lower bound (Ptx_lower) and the upper bound (Ptx_upper) of the entering overload threshold.

Based on the comparison and judgment of the above entering overload threshold and the departing overload threshold with the practical forward transmission power in the sector, the dynamical adjustment of the sector forward transmission power control threshold can be realized, ensuring that the whole sector is in a sound transmission state. The method is simple and practical, and can promote the performance of the system effectively.

The invention claimed is:

1. A method for adjusting a forward transmission power control threshold in a mobile communication system including a base station and one or more terminals in a sector, comprising the steps of:
  a. pre-setting at the base station an entering overload control threshold for a total forward transmission power in the sector, a lower bound (Ptx_lower) and an upper bound (Ptx_upper) of a forward transmission power control threshold, and adjustment ranges of said lower bound and said upper bound; said adjustment ranges of said lower bound and said upper bound defining a width within which the lower bound and the upper bound of said forward transmission power control threshold are permitted to fluctuate;
  b. obtaining a current total forward transmission power of the sector;
  c. judging whether the current total forward transmission power exceeds said entering overload control threshold, if yes, turning to step d; otherwise, turning to step f with no adjustment;
  d. judging whether the current total forward transmission power exceeds the adjustment ranges of said lower bound and said upper bound, if not, reducing the forward transmission power control threshold corresponding to all terminals in the sector; if yes, turning to step f directly; and
  f. completing the adjustment of the forward transmission power control threshold;
  wherein
  in step a, the pre-setting the adjustment ranges of the lower bound and the upper bound of the forward transmission power control threshold in the sector comprises a step of pre-setting an adjustment step length parameter (Δ) and a step of pre-setting a permitted adjustment times (m);

product of said adjustment step length parameter (Δ) and said permitted adjustment times (m) makes the adjustment range of said lower bound as (Ptx_lower_mΔ, Ptx_lower), and the adjustment range of said upper bound as (Ptx_upper-mΔ, Ptx_upper).

2. The method for adjusting a forward transmission power control threshold in a mobile communication system of claim 1, wherein in said step d, the details of reducing the forward transmission power control threshold to which all terminals in the sector correspond is:

judging whether the adjustment ranges of said lower bound or upper bound will be exceeded after the adjustment, if yes, turning to step f; if not, reducing the forward transmission power control threshold of all terminals in the sector by a value corresponding to said adjustment step length parameter (Δ).

3. The method for adjusting a forward transmission power control threshold in the mobile communication system of claim 2, wherein:

said step a also comprises a step of pre-setting a departing overload control threshold of said total forward transmission power in the sector at the base station; said departing overload threshold is not greater than said entering overload threshold;

in said step c, when said total forward transmission power in the sector does not exceed said entering overload control threshold, a step is added for judging whether said total forward transmission power in the sector is lower than said departing overload control threshold, if not, turning to step f; if yes, turning to an additional step e;

said step e is: judging whether said total forward transmission power in the sector exceeds the adjustment ranges of said lower bound and upper bound, if not, increasing the forward transmission power control threshold to which all terminals in the sector correspond; if yes, turning to step f.

4. The method for adjusting a forward transmission power control threshold in a mobile communication system of claim 3, wherein:

said step a also comprises a step of pre-setting a departing overload control threshold of said sector forward transmission power at the base station side; said departing overload threshold is not greater than said entering overload threshold;

in said step c, when said sector forward transmission power does not exceed said entering overload control threshold, a step is added for judging whether said sector forward transmission power is lower than said departing overload control threshold, if not, turning to step f; if yes, turning to an additional step e;

said step e is: judging whether said sector forward transmission power exceeds the adjustment ranges of said lower bound and upper bound, if not, increasing the forward transmission power control threshold to which all terminals in the sector correspond; if yes, turning to step f;

wherein in said step e, the detailed process of increasing the forward transmission power control threshold to which all terminals in the sector correspond is:

judging whether said forward transmission power control threshold after the adjustment will exceed the adjustment range of said lower bound or upper bound; if yes, turning to step f; otherwise, increasing the forward transmission power control threshold of all terminals in the sector by a value corresponding to one said adjustment step length parameter (Δ).

5. The method for adjusting a forward transmission power control threshold in a mobile communication system of claim 1, wherein after said step b, a step is added for judging whether there is a forward transmission power control threshold to which some terminals in the sector correspond that is greater than the lower bound (Ptx_lower) or upper bound (Ptx_upper) respectively, if the judging result is "yes", forcibly setting the forward transmission power control threshold to which the some terminals correspond as the lower bound (Ptx_lower) or upper bound (Ptx_upper).

6. The method for adjusting a forward transmission power control threshold in the mobile communication system of claim 1, wherein:

said step a also comprises a step of pre-setting a departing overload control threshold of said total forward transmission power in the sector at the base station; said departing overload threshold is not greater than said entering overload threshold;

in said step c, when said total forward transmission power in the sector does not exceed said entering overload control threshold, a step is added for judging whether said total forward transmission power in the sector is lower than said departing overload control threshold, if not, turning to step f; if yes, turning to an additional step e;

said step e is: judging whether said total forward transmission power in the sector exceeds the adjustment ranges of said lower bound and upper bound, if not, increasing the forward transmission power control threshold to which all terminals in the sector correspond; if yes, turning to step f.

7. The method for adjusting a forward transmission power control threshold in a mobile communication system of claim 6, wherein:

said step a also comprises a step of pre-setting a departing overload control threshold of said sector forward transmission power at the base station side; said departing overload threshold is not greater than said entering overload threshold;

in said step c, when said sector forward transmission power does not exceed said entering overload control threshold, a step is added for judging whether said sector forward transmission power is lower than said departing overload control threshold, if not, turning to step f; if yes, turning to an additional step e;

said step e is: judging whether said sector forward transmission power exceeds the adjustment ranges of said lower bound and upper bound, if not, increasing the forward transmission power control threshold to which all terminals in the sector correspond; if yes, turning to step f;

wherein in said step e, the detailed process of increasing the forward transmission power control threshold to which all terminals in the sector correspond is:

judging whether said forward transmission power control threshold after the adjustment will exceed the adjustment range of said lower bound or upper bound; if yes, turning to step f; otherwise, increasing the forward transmission power control threshold of all terminals in the sector by a value corresponding to one said adjustment step length parameter (Δ).

8. A method for adjusting a forward transmission power control threshold in a mobile communication system including a base station and one or more terminals in a sector, comprising the steps of:
- a. pre-setting at the base station an entering overload control threshold for a total forward transmission power in the sector, a lower bound (Ptx_lower) and an upper bound (Ptx_upper) of a forward transmission power control threshold, and adjustment ranges of said lower bound and said upper bound; said adjustment ranges of said lower bound and said upper bound defining a width within which the lower bound and the upper bound of said forward transmission power control threshold are permitted to fluctuate;
- b. obtaining a current total forward transmission power of the sector;
- c. judging whether the current total forward transmission power exceeds said entering overload control threshold, if yes, turning to step d; otherwise, turning to step f with no adjustment;
- d. judging whether the current total forward transmission power exceeds the adjustment ranges of said lower bound and said upper bound, if not, reducing the forward transmission power control threshold corresponding to all terminals in the sector; if yes, turning to step f directly; and
- f. completing the adjustment of the forward transmission power control threshold;

wherein said step a further comprises a step of pre-setting a departing overload control threshold of said total forward transmission power in the sector at the base station; said departing overload threshold is not greater than said entering overload threshold;

in said step c, when said sector forward transmission power does not exceed said entering overload control threshold, a step is added for judging whether said total forward transmission power in the sector is lower than said departing overload control threshold, if not, turning to step f; if yes, turning to an additional step e;

said step e is: judging whether said total forward transmission power in the sector exceeds the adjustment ranges of said lower bound and upper bound, if not, increasing the forward transmission power control threshold to which all terminals in the sector correspond; if yes, turning to step f.

9. The method for adjusting a forward transmission power control threshold in a mobile communication system of claim 8, wherein in said step e, the details of increasing the forward transmission power control threshold to which all terminals in the sector correspond is:

judging whether said forward transmission power control threshold after the adjustment will exceed the adjustment range of said lower bound or upper bound; if yes, turning to step f; otherwise, increasing the forward transmission power control threshold of all terminals in the sector by a value corresponding to said adjustment step length parameters ($\Delta$).

* * * * *

UNITED STATES PATENT AND TRADEMARK OFFICE
CERTIFICATE OF CORRECTION

PATENT NO.        : 7,840,231 B2  
APPLICATION NO.   : 11/720821  
DATED             : November 23, 2010  
INVENTOR(S)       : Xuemin Liu Page 1 of 1

It is certified that error appears in the above-identified patent and that said Letters Patent is hereby corrected as shown below:

Column 8, Line 67, Claim 7:

After "length parameter"  
Delete "A" and insert -- $\Delta$ --.

Signed and Sealed this  
Twenty-second Day of February, 2011

David J. Kappos  
*Director of the United States Patent and Trademark Office*